Patented May 21, 1946

2,400,859

UNITED STATES PATENT OFFICE 2,400,859

METHOD OF RECOVERING GLYCEROL FROM FERMENTED LIQUORS

James S. Wallerstein, New York, N. Y., Eduard Farber, New Haven, Conn., and Victor Dayton, New York, N. Y., assignors to The Overly Bio-Chemical Research Foundation, Inc., New York, N. Y., a corporation of New York No Drawing. Application April 3, 1943,
Serial No. 481,771

15 Claims. (Cl. 195—14)

Our invention relates to the recovery of glycerol from fermented mashes and other liquors of organic origin containing nitrogenous, and particularly proteinaceous impurities; and more particularly, to the purification of such liquors whereby to facilitate the recovery of glycerol and improve the yield thereof.

It is one of the primary objects of the invention to provide a simple and inexpensive procedure for precipitating from solutions obtained by the chemical or bio-chemical treatment of organic materials, and containing, together with glycerol, also organic nitrogen-containing bodies, and particularly proteins and products of their hydrolytic or other degradation, those substances, composed for the most part, if not altogether, of the nitrogenous compounds referred to, which interfere with the efficient recovery of the glycerol.

It is also an object of the invention to provide a process for the pre-treatment of glycerol-containing liquors, whereby the latter are freed from impurities which unfavorably affect the glycerol distillation, and for accomplishing this end with the aid of a cheap and readily available agent for precipitating the interfering substances, and particularly the nitrogenous materials, whereby a glycerol-containing liquor is obtained from which the glycerol can be distilled in a high state of purity and in high yield.

Other objects of the invention will appear as the description of the invention proceeds, and the features of novelty will be set out in the appended claims.

Briefly described, our invention involves the addition to glycerol-containing fermented mashes and other glycerol-bearing liquors of similar composition, of a water-soluble form of lignin under an adjusted pH in the acid range such that a precipitate is obtained both of the ligneous material and of a large proportion of the interfering impurities above described, the precipitate being of such character that it can be easily separated by filtering or centrifuging. The flocculation of the precipitate may be aided by boiling the lignin-containing mixture. After the removal of the precipitate, the pH of the solution is again adjusted to an acid range and the glycerol distilled with the aid of steam or any other suitable manner. The water-soluble lignin derivative need not however be added to an already fermented mash, but may be added prior to the fermentation. Thus it may be added to the hydrolyzation product of a carbohydrate-containing material, such as wheat or other grain, or other liquors obtained by the acid hydrolysis of waste carbohydrate material. Where the soluble lignin derivative has been added prior to fermentation, concentration and acidification of the fermentation liquor to a pH range of about 0 to 3 will usually be sufficient to cause further precipitation of lignin and nitrogenous bodies; if desired, however, a second lignin treatment can be carried out at this point.

In the present methods of recovering glycerol after fermentation, the yeast is separated off, the alcohol and other of the more volatile frementation products distilled, and the residual liquor concentrated into a thick syrup. The latter is distilled with the aid of superheated steam in a vacuum chamber, the glycerol vapors being carried off with the steam. Subsequently the glycerol vapors are deposited in a hot condenser, the steam being either recirculated through another glycerol concentrate or condensed in a second or cold condenser. The system is maintained under a vacuum of 25–29 inches by means of a vacuum pump or aspirator.

The method has been varied in different ways, as, for example, by spraying or finely distributing the concentrated glycerol slops, by the use of carbon dioxide and other inert gases in place of superheated steam, by flash distillation at atmospheric pressure, etc.

Whatever the method of distillation employed, where sizable quantities of nitrogenous matter are present, the distillation is interfered with in various ways. Considerable foaming and frothing are created within the distillation chamber, and as the distillation continues, a thick impervious mass forms at the bottom of the distillation chamber which retards and impedes the inflow of superheated steam. Because of the poor heat transfer within this mass, and the difficulty with which it can be penetrated by the steam, full recovery of the glycerol is prevented. The tendency to condensation of the steam or of local overheating is increased and, after distillation, a sizable crust remains in the chamber which can be removed only with difficulty. Where a spray method is employed, these nitrogenous materials tend to clog up the nozzle. Moreover, because of the presence of these nitrogenous matters, a lower degree of concentration in the original glycerol solution can be achieved so that more heat is required for the distillation, and there is less efficiency in the recovery. In addition, it appears that in the case of grain mashes these nitrogenous matters help bring about the formation of decomposition products which reduce the purity of the distilled glycerol.

By using the purification method of the present invention, it is possible to reduce the foaming and frothing occurring on distillation. The glycerol solution can be concentrated to a higher degree with consequent better heat transfer and more efficient recovery. There is also a greater permeability to the steam or other carrier vapor or gas. Smaller residues are left in the distillation chamber; there is less tendency to steam condensation or local overheating; and if spraying is employed, there is less nozzle-clogging. The tendency to form decomposition products also is reduced.

We have found that a substantial portion of the noncarbohydrate impurities of glycerol-containing solutions can be removed by adding water-soluble derivatives of lignin, and suitably adjusting the acidity of the mixture. A commercially available form of water-soluble lignin derivative is the sulfite waste liquor either in its crude original form, or in the concentrates which are obtained by neutralizing it to about pH=6 to 7 and evaporating water from the original dilute sulfite waste liquor. Another form of such lignin derivative can be prepared, for instance, by precipitating the so-called black liquor obtained in the alkaline cooking of wood by adding a mineral acid as, for example, hydrochloric, sulfuric, nitric, etc. The precipitated lignin preparation may then be re-dissolved in alkali and thereby obtained in a purer form. Still another form is produced when lignin of any source is at least partially chlorinated and extracted with water. In the following description, the lignin sulfonic acid and its salts as they are obtained from sulfite waste liquor are taken as an example. Any other of the mentioned lignin solutions can be used accordingly with obvious modifications.

When a solution containing lignin sulfonic acid in the form of its calcium, sodium, or other soluble salt is added to a solution which contains proteins and products of protein degradation formed under acid treatment in the presence of carbohydrates, a precipitation takes place. The precipitate is soluble in alkali and strong acid but less soluble or insoluble at moderately low acidities in the vicinity of pH=0 to 3. It is therefore advantageous to adjust the solution to such relatively low acidity in order to obtain not only the greatest amount of precipitate, but also the best form of it as regards the ease of its removal from the solution.

The ligneous matter precipitating within the pH range above disclosed carries with it not only the higher molecular weight, nitrogenous bodies of the order of the proteins, and their immediate hydrolytic decomposition products, but also nitrogen compounds of lower molecular weight; and apparently also other impurities are carried down, perhaps by adsorption. The purification is of such high degree that the difficulties heretofore encountered in the crystallization or distillation of the products of hydrolysis, fermentation, etc., are in large part, or from a practical standpoint even completely, eliminated, so that the process of recovery is facilitated and the yields improved.

The amount of lignin sulfonic acid necessary to produce a precipitate containing a substantial part of the nitrogen-containing matter formerly dissolved with the carbohydrates, is small. In general, it is sufficient to add so much of the lignin solution that about one part by weight of lignin sulfonic acid is present for about one part by weight of proteinaceous or nitrogenous matter. In practice, an excess over this proportion may be employed but it is preferred that it be small, so that under the acid conditions not only is the proteinaceous matter removed in the best form for separation, but the amount of impurities introduced with the lignin sulfonic acid solution which are not precipitated under these conditions is insignificant. Some of these impurities will consist in sulfite salts; others in carbohydrates, either of the hexose or of the pentose type.

This treatment is particularly advantageous when the glycerol is prepared by fermentation of sugars derived by the hydrolysis of wheat, corn, and other grain, where large amounts of nitrogenous matter are present, and all previously cited difficulties are particularly marked.

When grain mashes are distilled, even after the lignin treatment, considerable foaming and frothing continue to occur if the distillation is carried out at alkaline or neutral pH's. If, however, the distillation is carried out at fairly acid pH's (lower than pH 5.0) the foaming and frothing are eliminated, and there is a noticeable improvement in the yield of the glycerol recovered. At these reduced pH values, also, polymerization of the glycerol to form diglycerol and higher polymers, as well as condensation of the glycerol, is prevented, and greater and purer yields are obtained. Such a low pH also will tend to keep a concentrated slop more permeable to the steam or other vaporous or gaseous carrier used to aid distillation.

For example, a wheat mash is prepared by hydrolysis of the wheat carbohydrates to maltose with the aid of a high diastatic malt, the maltose hydrolyzed by 0.5% hydrochloric acid, and the mash heated briefly to boiling in the presence of a water-soluble lignin preparation, the pH of the mixture being adjusted to within the range of 0 to 3, if it is not already so, with hydrochloric acid. Thereafter the precipitated impurities of nitrogen-lignin nature are filtered off. Then the pH is adjusted and a glycerol fermentation by means of sulfite (for example, the sodium, calcium, or magnesium salt), mild alkalies (or low concentrations of the strongly alkaline substances) or other steering agents, is conducted in known manner. Thereafter the yeast is filtered off, the alcohol and other volatile products recovered by distillation, and the remaining solution concentrated.

Although a second lignin treatment after fermentation may be desirable, if considerable nitrogenous matters remain in the mash, we have found that, after the solution has undergone approximately a six-fold concentration, and if sufficient soluble lignin derivative has been added in the beginning, it is usually not necessary to add further lignin derivative, but merely to acidify to about pH=1.0, preferably with a mineral acid like sulfuric. At that point, in the six-fold concentrated solution, a marked precipitation of previously unprecipitated lignin-protein or other complex nitrogenous bodies, together with other impurities, tends to occur. This can readily be filtered or centrifuged off, and the glycerol solution further concentrated, after partial neutralization to about pH 4.0. Addition of further lignin, at this point, tends to darken the color of the solution, and accordingly should be employed only when acidification alone fails to induce adequate settling of remaining nitrogenous matter.

Formation of the insoluble protein-lignin compounds takes place readily on heating, the precipitate settling out in heavy flocs on cooling.

After the removal of the impurities, the glycerol slops are preferably further concentrated to at least 50% solids. Thereafter, distillation may be carried out according to the methods previously known in the art.

Such a second purification subsequent to fermentation, when carried out in addition to the original lignin treatment, will have a substantial effect in further improving the distillation, and foaming will be markedly reduced and the recovery improved.

We have found that in the case of grain mashes a particularly favorable method of distillation resulting in higher yields and a more purified product consists in spraying the purified, acidified glycerol concentrate through a nozzle of known construction, into a rising counter-current of superheated steam of about 200-250° C. in a vacuum of about 28 inches. A distillation may be carried out under these conditions either at atmospheric or at reduced pressure, the former requiring a greater flow of steam.

It has been found advantageous in distillation of this kind to have carbon dioxide present in the vapor, either by using the carbon dioxide as a means of spraying and distributing the concentrated liquor, or by using carbon dioxide gas introduced in other ways. The presence of carbon dioxide under these conditions appears to have a specifically favorable action.

A more detailed procedure is described below by way of example, without, however, limiting the invention thereto, and not as indicating the scope of the invention.

Example

Wheat flour is digested with malt diastase. After filtration, 0.5% sulfuric acid is added together with an alkaline solution of lignin sulfonic acid in an amount slightly in excess of the protein present in the mash. The solution is heated to a vicinity of 90° C. as on a boiling water bath for a period of one hour, and then cooled. During the cooling process heavy flocs of protein-lignin, including combinations of the lignin derivative with nitrogenous matter of protein or similar origin, fall out of solution, removing the greater quantity of the nitrogenous matter. The hydrolysis of the wheat flour is then continued until 90% or better of the starch has been converted into glucose. Thereupon the mash is neutralized to an appropriate pH as by means of lime, and a suitable steering agent, as for example, alkali or sulfite, is added together with an appropriate quantity of yeast, as is well known in the art.

After the fermentation, the yeast is filtered off, the alcohol and other readily volatile fermentation products recovered by distillation, and the remaining solution acidified to the vicinity of pH 1. A small amount of additional lignin is then added slightly in excess of the nitrogenous matters still present. At this point, the solution is again heated at 90° C. for a one-hour period, and a secondary precipitation of protein-lignin together with other impurities, occurs.

The pH is now adjusted to 4.0 and the mixture filtered and the filtrate concentrated. The concentrated glycerol contained in the slops is sprayed with the aid of $CO_2$ gas through a nozzle downward in an evacuated chamber against a rising current of superheated steam. The glycerol vapors are carried over by the steam into a hot condenser maintained in the vicinity of 80° C. while the bulk of the steam is condensed in a second or cold condenser.

The pH value of the glycerol solution being distilled should be, as above explained, in the acid range. With certain mashes, too high an acidity is undesirable, and often leads to resinification. The optimum pH value for all mashes cannot be stated because it depends on numerous variables, such as the origin of the mash or liquor, the concentration of glycerol, the nature of the impurities, etc. In general, however, a pH range of 3 to 5 will give best results.

We claim:

1. In a process for the recovery of glycerol by distillation from fermentation liquors containing the same, the steps which comprise mixing the liquor with a water-soluble form of lignin which is insoluble at a pH of about 5 and below, the mixing being effected at a pH value in the acid range such that a precipitate of lignin and nitrogenous material is produced, and separating the solution from the precipitate.

2. In a process for the recovery of glycerol by distillation from fermentation liquors containing the same, the steps which comprise adding to the liquor a water-soluble form of lignin which is insoluble at a pH of about 5 and below, acidifying the mixture until a precipitate is formed, and separating the solution from the precipitate.

3. Process according to claim 1, wherein the pH of the mixture is adjusted to a value of approximately 0 to 3.

4. Process according to claim 1, wherein the pH of the mixture is adjusted to a value of approximately 0 to 3, and wherein the mixture is heated to promote flocculation.

5. In a process for the recovery of glycerol by distillation from fermented grain mashes, the step which comprises adding to the mash a water-soluble form of lignin at a resulting pH value such that precipitation of lignin and nitrogenous matter is produced, and separating the solution from the precipitate.

6. In a process for the recovery of glycerol by distillation from fermented grain mashes, the steps which comprise adding a water-soluble form of lignin to a fermented grain mash, acidifying the mixture to a point at which precipitation occurs, and separating the solution from the precipitate.

7. In a process for the recovery of glycerol by distillation from fermented grain mashes, the steps which comprise mixing a water-soluble form of lignin with the grain mash at a resulting pH of about 0 to 3 to cause precipitation of lignin and nitrogenous matter, and separating the solution from the precipitate.

8. Process for the recovery of glycerol by distillation from fermented grain mashes, comprising purifying the fermented grain mash by precipitating impurities with the aid of water-soluble form of lignin, under acid conditions, filtering the mixture, concentrating the liquor, and distilling the glycerol at a higher acidity than that corresponding to a pH value of 5.0.

9. Process for the recovery of glycerol by distillation from fermented grain mashes which comprises purifying a fermented grain mash by precipitating impurities with the aid of a water-soluble form of lignin, under acid conditions, filtering the mixture, concentrating the liquor, and distilling the same with steam under reduced pressure and in the presence of carbon dioxide.

10. Process for the manufacture of glycerol which comprises hydrolyzing the carbohydrates in a wheat mash to maltose, treating the product with approximately 0.5% hydrochloric acid, boiling the mixture with a water-soluble lignin, separating the precipitate and subjecting the liquor to glycerol fermentation, removing insolubles, and distilling off the more volatile products, concentrating the residual liquor and acidifying the same to a pH value of approximately 1.0, removing any precipitate that is formed, partially neutralizing the solution, and distilling the glycerol therefrom.

11. Process according to claim 10, wherein the partial neutralization is to a pH value of approximately 3.

12. Process according to claim 10 wherein, following the distillation of the more volatile components, the residual liquor is concentrated to approximately one-sixth its original volume.

13. Process according to claim 10, wherein, following the distillation of the more volatile components, the residual liquor is treated with a second portion of a water-soluble form of lignin to effect further precipitation.

14. Process according to claim 10, wherein the residual, glycerol-containing liquor is concentrated prior to distillation of the glycerol.

15. Process for the manufacture of glycerol which comprises hydrolyzing the carbohydrates in a wheat mash to maltose, treating the product with approximately 0.5% hydrochloric acid, boiling the mixture with a sulfite waste liquor, separating the precipitate and subjecting the liquor to glycerol fermentation, removing insolubles, and distilling off the more volatile products, concentrating the residual liquor and acidifying the same to a pH value of approximately 1.0, removing any precipitate that is formed, partially neutralizing the solution, and distilling the glycerol therefrom.

JAMES S. WALLERSTEIN.
EDUARD FARBER.
VICTOR DAYTON.